UNITED STATES PATENT OFFICE.

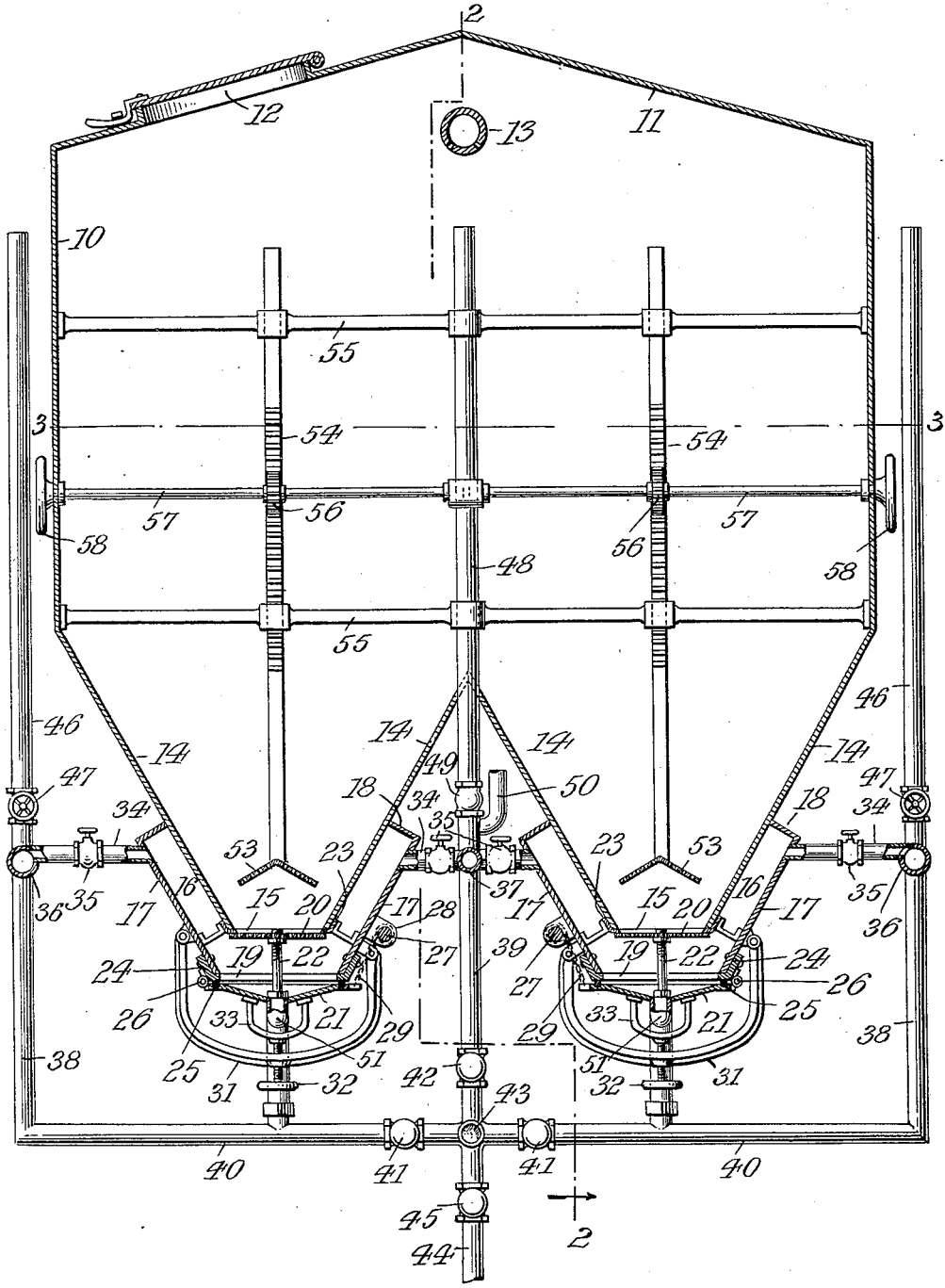

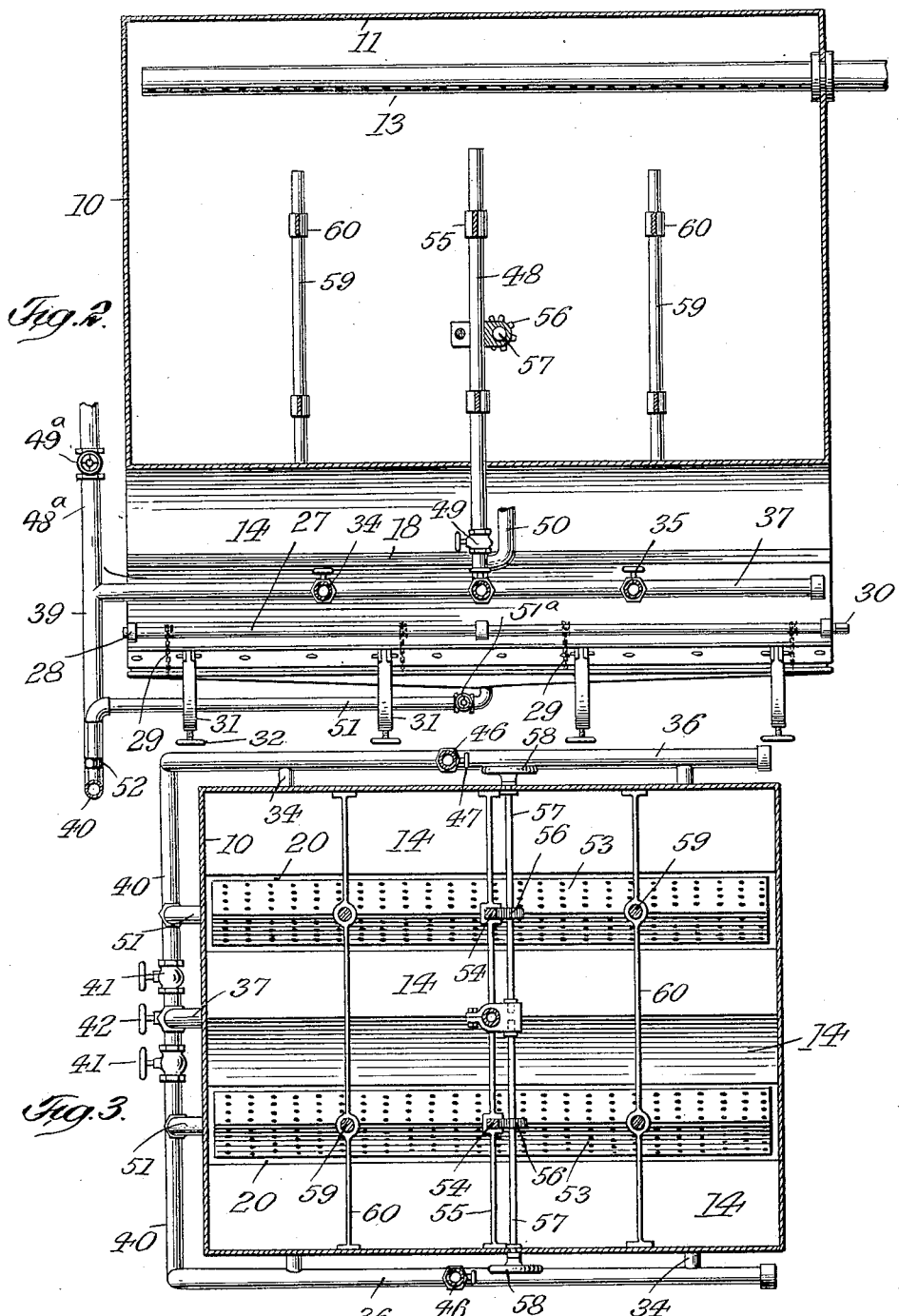

OTTO SELG, OF NEW YORK, N. Y.

BREWER'S FILTERING APPARATUS.

1,101,098. Specification of Letters Patent. Patented June 23, 1914.

Application filed February 16, 1914. Serial No. 819,086.

*To all whom it may concern:*

Be it known that I, OTTO SELG, a citizen of the United States, and a resident of New York city, borough of Bronx, county of Bronx, and State of New York, have invented certain new and useful Improvements in Brewers' Filtering Apparatus, of which the following is a specification.

This invention relates to a brewer's filtering apparatus of novel construction, more particularly designed for filtering the wort from grains, and for hops and similar matter.

The apparatus will insure a perfect extraction of the grain, hops, etc., avoid suction, prevent the floating slimy substances from descending into the filtering stratum and produce a brilliant filtrate in a shorter time than was heretofore generally required. So also the formation of cracks and channels in the grain through which the sparging water may flow instead of percolating is prevented, the spent grain or hops may be readily discharged, and the entire operation may be fully controlled by the operator in all of its stages.

In the accompanying drawing: Figure 1 is a vertical cross section of a brewer's filtering apparatus embodying my invention; Fig. 2 a vertical longitudinal section on line 2, 2, Fig. 1, and Fig. 3 a horizontal section on line 3, 3, Fig. 1.

The apparatus comprises essentially a vessel 10, adapted to receive the material to be filtered, and provided with a top 11, having a man hole 12, and with a sparger 13, below the top. The bottom of vessel 10, is made in a suitable number of hopper-shaped sections, two of such sections being shown, while a single section, or more than two sections may be used if desired. Each hopper-shaped section is composed of two slanting sides 14, that converge from top to bottom, and have a suitable length and dip. At their lower ends, the two sides 14, are so spaced as to form a discharge opening 15 therebetween, the size of such opening being also a matter of choice. Below the bottom of the hopper there is provided a pocket or trough 16, formed by a pair of outer walls 17, arranged in parallelism with sides 14, and extending a suitable distance up along the sides, the pocket being closed at its upper end by inwardly extending flanges 18. At their lower ends, walls 17 are also spaced to form a discharge opening 19, which is arranged directly below opening 15, and is of course somewhat wider than the latter.

The two openings 15, 19 are controlled by a lid composed of an upper perforated plate 20, and a lower imperforate plate 21, said plates being connected to each other by a nut-carrying bolt 22, by means of which a slight adjustment is permitted, sufficient to insure the proper spacing of the plates. The upper perforated plate or false bottom 20 is adapted to close upper opening 15, by engaging a pair of angle plates 23, secured to and projecting beneath the lower edges of sides 14. In like manner plate 21 is adapted to close lower opening 19 by engaging angle plates 24 of walls 17, a packing 25 being however here provided.

The lid constructed as described is hingedly connected to one of the side walls 17 or angle plates 24 as at 26, while it is adapted to be swung into its open or closed position by means of a shaft 27 journaled in lugs 28 on the other side wall 17, and connected to the free end of the plate by chains 29. The end of shaft 27 is squared at 30 for the reception of a key, by means of which the shaft may be turned to wind or unwind the chains and thus close or open the lid. Means are provided for tightly holding the bottom to its seat, against the heavy pressure to which it is subjected during use. These means consist of a yoke 31, hingedly connected to one of the side walls 17, and adapted to be detachably connected by a pin or otherwise to the other side wall. Into this yoke is tapped a screw 32, adapted to engage a bail 33, depending from the lid, so that by tightening up the screw the lid is forced against its seat. It will be seen that by the construction described, the pocket 16, extends up along the inclined walls 14, a substantial distance above the discharge opening 15, and false bottom 20 (when the latter is in its closed position) thus forming an accumulating chamber in which the filtrate is adapted to rise to an elevation considerably above that of the discharge opening. At or near its top, and consequently at a distance above the discharge opening 15, each pocket 16 is tapped by a number of laterally extending branch pipes or ducts 34, controlled by cocks 35. Each set of these ducts communicates with a common longitudinally arranged pipe 36 of large diameter which extends along the side of vessel 10, two of such pipes being provided, while with the dual hopper arrangement shown, an additional pipe 37 is arranged intermediate the hoppers. Pipes 36, 37 are closed at their rear ends, while they extend at their forward end some distance in front of vessel 10, and are here turned downwardly as at 38, 39 to communicate with a common transversely arranged collecting pipe 40, which is secured some distance in front of vessel 10, and is controlled by cocks 41, 42, while an observation glass 43, permits the filtering operation to be continuously watched. From pipe 40, a discharge pipe 44, controlled by cock 45 leads to a pump or to a tank or other receptacle adapted to receive the filtrate.

In order to prevent suction from interfering with the filtering operation, each pipe 36 communicates with an upwardly extending air tube 46, controlled by cock 47, while pipe 37 communicates with air tubes 48, 48$^a$ controlled by cocks 49, 49$^a$ the cocks 47, 49, 49$^a$ being designed to cut off the air pressure, whenever suction is especially required, which may be the case, during the last stages of the filtering operation. Into say the lower end of the central air tube 48 there enters a hot water pipe 50, controlled by a suitable cock (not shown), and adapted to admit a body of hot water into the pockets 16, more particularly for washing out purposes. Each pocket 16, while communicating at its upper end with collecting pipe 40, through ducts 34, also communicates with such pipe directly by means of a bent pipe 51, having cock 51$^a$ and fitted at one of its ends into an eye of imperforate bottom plate 21, while its other end is connected to pipe 40 by means of a coupling 52, it being of course obvious that pipe 51 must be uncoupled before the lid can be raised or lowered.

Within vessel 10, there is centered at each hopper-section above perforated plate 20, a presser 53 made in the form of a peaked and perforated plate, that extends lengthwise through the vessel. Plate 53 is operated by means of a rack 54, guided in braces 55 and engaged by a pinion 56 fast on a shaft 57, that may be turned by a hand wheel 58. Plates 53 are guided by rods 59 engaging braces 60. It may here be mentioned that if desired the troughs 16 may extend entirely around vessel 10, in lieu of flanking the same, and that it is preferred to give to the vessel a slight dip in a longitudinal direction from the ends toward the center, as indicated in Fig. 2.

When the apparatus is used for filtering mash, so as to separate the clear wort from the grain, the mash is run or pumped into vessel 10, when the heavier particles constituting the filting medium, will settle on the false bottom 20, while the lighter particles or slimy substances, such as albumens, ground up cellulose, or "oberteig" will be forced to the surface. A few barrels of water of about the same temperature as the mash may now be injected from below by pipes 50 and 34, to bring all of the fine particles to the surface, and to clean up the space below the false bottom, and to permit a fast and brilliant running of the wort, which is started a few minutes after all the wort has been introduced into the vessel, the proper air and liquid cocks being of course opened. After the first wort has been nearly run off, the sparging through pipe 13 begins, this operation requiring a smaller quantity of water for extracting the grains than was heretofore generally found necessary. During the running off of the first wort, the presser 53 may be forced down a trifle to pack the lower strata of grain sufficiently for regulating the flow and brilliancy of the output. Before sparging begins the presser should however be tightened down more firmly to keep the finer particles of the upper strata, from entering into the lower or filtering strata, which would greatly diminish the flow of the wort and the quantity of the output. After the filtering operation has been completed the lids are opened and the grain is dumped out. The apparatus may also be readily used as a hop jack or strainer, and for similar brewers' devices, that will readily suggest themselves to persons skilled in the art.

By my invention safeguards are provided that prevent the grains, hops or other substances from becoming packed too tightly, while all siphon action or suction is avoided, even when the wort is run to a very low level or is taken off by a pump. So also a loose buoyant layer of the filtering medium is obtained, the desired density of which is insured by means of the presser plates. As the false bottoms are comparatively narrow, an evenly running product and a uniform extraction is obtained, while more particularly by means of the pockets the flow of the filtrate will be rapid and unimpeded. At the end of the operation the liquid remaining in the grain or hops can be sucked out through outlet 52, by first closing the air vents and all other outlets and forcing down the presser plates.

I claim:

1. A filtering apparatus comprising a vessel having an inclined bottom provided with a lower discharge orifice, an open trough extending along said bottom a substantial distance above said orifice, a plate adapted to close the trough, a perforated plate adapted to engage the inclined bottom, and an exit duct communicating with the trough at an elevation above the discharge orifice.

2. A filtering apparatus comprising a vessel having an inclined bottom provided with a lower discharge orifice, an open trough extending along said bottom a substantial distance above said orifice, a lid having a lower plate adapted to close the trough and an upper perforated plate adapted to engage the inclined bottom, and an exit duct communicating with the trough at an elevation above the discharge orifice.

3. A filtering apparatus comprising a vessel having an inclined bottom provided with a lower discharge orifice, an open trough extending along said bottom a substantial distance above said orifice, means for closing the trough, a perforated plate adapted to engage the inclined bottom, a pipe connecting with the trough, near the upper end thereof and at an elevation above the discharge orifice, and a vent entering said pipe.

4. A filtering apparatus comprising a vessel having an inclined bottom, an open trough extending along said bottom, means for closing the trough, a perforated plate adapted to engage the inclined bottom, a pipe extending longitudinally along the vessel and connected to the trough, a second pipe communicating with the first named pipe and extending along the front of the vessel, and a branch connecting the trough closing means with said last named pipe.

5. A filtering apparatus comprising a vessel having an inclined bottom, an open trough extending along said bottom, a hinged lid having a lower plate adapted to close the trough and an upper perforated plate adapted to engage the inclined bottom, and adjustable means for spacing said plates.

6. A filtering apparatus comprising a vessel having an inclined bottom, an open trough extending along said bottom, a hinged lid having a lower plate adapted to close the trough and an upper perforated plate adapted to engage the inclined bottom, a yoke hingedly connected to the vessel, a screw tapped into the yoke, and a bail depending from the lid and adapted to be engaged by the screw.

7. A filtering apparatus comprising a vessel having an inclined bottom, an open trough extending along said bottom, a hinged lid having a lower plate adapted to close the trough and an upper perforated plate adapted to engage the inclined bottom, a shaft journaled in the vessel, and a chain carried by said shaft and connected to the lid.

8. A filtering apparatus comprising a vessel having an inclined bottom, an open trough extending along said bottom, a plate adapted to close the trough, a perforated plate adapted to engage the inclined bottom, liquid discharge means communicating with the trough, and an angular apertured presser vertically adjustable in the vessel above the perforated plate.

9. A filtering apparatus comprising a vessel having an inclined bottom, an open trough extending along said bottom, a plate adapted to close the trough, a perforated plate adapted to engage the inclined bottom, a filtrate discharge pipe communicating with the upper part of the trough, a vent pipe communicating with the liquid discharge pipe, and a liquid inlet pipe also communicating with the trough.

10. A filtering apparatus comprising a vessel having an inclined bottom, an open trough extending along said bottom, a lid adapted to close the trough and having a perforated upper plate adapted to engage the inclined bottom, a discharge pipe communicating with the trough and the lid, a vent connected to the discharge pipe, an inlet pipe likewise communicating with the trough, and a perforated vertically movable presser within the vessel above the lid.

11. A filtering apparatus comprising a vessel having an inclined bottom, an open trough extending along said bottom, a lid adapted to close the trough and having a perforated upper plate, adapted to engage the inclined bottom, a discharge pipe extending along the side of the vessel and communicating with the trough, a second pipe communicating with the first named pipe and extending along the front of the vessel, a vent connected to the first named pipe, means for directly connecting the trough with the last named pipe, and a vertically movable presser within the vessel above the lid.

OTTO SELG.

Witnesses:
FRANK V. BRIESEN,
MARGA L. GREENBERG.

Copies of this patent may be obtained for five cents each, by addressing the "Commissioner of Patents, Washington, D. C."